US011115085B1

(12) United States Patent
Song et al.

(10) Patent No.: US 11,115,085 B1
(45) Date of Patent: Sep. 7, 2021

(54) MIMO-OFDM SYSTEM FOR INCREASING RELIABILITY

(71) Applicant: INDUSTRY-ACADEMIA COOPERATION GROUP OF SEJONG UNIVERSITY, Seoul (KR)

(72) Inventors: Hyoung-Kyu Song, Seongnam-si (KR); Yu-Jin Na, Yongin-si (KR); Min-Jae Paek, Seoul (KR)

(73) Assignee: INDUSTRY-ACADEMIA COOPERATION GROUP OF SEJONG UNIVERSITY, Seoul (KR)

( * ) Notice: Subject to any disclaimer, the term of this patent is extended or adjusted under 35 U.S.C. 154(b) by 0 days.

(21) Appl. No.: 17/084,606

(22) Filed: Oct. 29, 2020

(30) Foreign Application Priority Data

Jul. 24, 2020 (KR) .......................... 10-2020-0092188

(51) Int. Cl.
*H04B 7/026* (2017.01)
*H04L 5/00* (2006.01)
(Continued)

(52) U.S. Cl.
CPC ............ *H04B 7/026* (2013.01); *H04B 7/046* (2013.01); *H04B 7/15507* (2013.01); *H04L 5/0007* (2013.01)

(58) Field of Classification Search
CPC ..... H04L 25/20; H04L 5/0007; H04L 5/0035; H04B 7/026; H04B 7/0413; H04B 7/0469;
(Continued)

(56) References Cited

U.S. PATENT DOCUMENTS

2006/0050655 A1* 3/2006 Shi ................... H04L 25/0246
370/254
2007/0129008 A1* 6/2007 Shi ................... H04B 7/2606
455/11.1
(Continued)

FOREIGN PATENT DOCUMENTS

KR 10-0799580 B1 1/2008
KR 10-1268480 B1 6/2013
(Continued)

OTHER PUBLICATIONS

W. Kim et al, "Relay Selection Scheme for Multi-hop Transmission of MU-MIMO System," Appl. Sci. Sep. 2018 (Sep. 27, 2018).
(Continued)

*Primary Examiner* — Khanh C Tran
(74) *Attorney, Agent, or Firm* — Revolution IP, PLLC

(57) ABSTRACT

A MIMO-OFDM system for increasing reliability includes a transmission terminal that includes $N_t$ transmission antennas and transmits a MIMO signal through relay terminals, and a reception terminal that receives the MIMO signal from the relay terminal through $N_r$ reception antennas, and the transmission terminal extracts a composite channel coefficient from a composite channel generated by matching a channel between the transmission terminal and the reception terminal with a channel between each of a plurality of the relay terminals and the reception terminal, selects the relay terminal corresponding to the composite channel coefficient having a maximized channel capacity from among the plurality of relay terminals by using the extracted composite channel coefficient, and transmits a MIMO signal to the reception terminal through the selected relay terminal.

7 Claims, 7 Drawing Sheets

(51) Int. Cl.
    *H04B 7/0456* (2017.01)
    *H04B 7/155* (2006.01)
(58) Field of Classification Search
    CPC .............. H04B 7/15557; H04B 7/0404; H04B 7/0486; H04B 7/0465; H04B 7/0626; H04B 7/15507; H04B 17/318; H04B 7/022; H04B 7/046; H04B 7/0632; H04B 7/15; H04B 7/15585
    See application file for complete search history.

(56) References Cited

U.S. PATENT DOCUMENTS

| | | | | |
|---|---|---|---|---|
| 2008/0049658 | A1* | 2/2008 | Asai | H04B 7/0413 |
| | | | | 370/315 |
| 2008/0165720 | A1* | 7/2008 | Hu | H04L 1/0625 |
| | | | | 370/315 |
| 2009/0268657 | A1* | 10/2009 | Alexiou | H04B 7/04 |
| | | | | 370/315 |
| 2012/0140796 | A1* | 6/2012 | Dai | H04B 7/15592 |
| | | | | 375/213 |
| 2012/0163488 | A1 | 6/2012 | Kim | |
| 2017/0201394 | A1* | 7/2017 | Lin | H04L 5/0048 |
| 2017/0208591 | A1* | 7/2017 | Rico Alvarino | H04L 5/0044 |
| 2018/0139680 | A1* | 5/2018 | Hui | H04L 45/122 |

FOREIGN PATENT DOCUMENTS

| | | |
|---|---|---|
| KR | 10-1363814 B1 | 2/2014 |
| KR | 10-2014-0115260 A | 9/2014 |
| KR | 10-1609100 B1 | 4/2016 |
| KR | 10-1954527 B1 | 3/2019 |
| KR | 10-2085403 B1 | 3/2020 |

OTHER PUBLICATIONS

J.Ryu et al, "Balanced Linear Precoding in Decode-and-Forward based MIMO relay Communications", IEEE Trans.on Wireless Comm., vol. 10, No. 7, Jul. 2011(Jul. 2011).

* cited by examiner

MIMO-OFDM SYSTEM FOR INCREASING RELIABILITY

TECHNICAL FIELD

The present disclosure relates to a MIMO-OFDM system for increasing reliability, and more particularly, to a MIMO-OFDM system for increasing a transmission rate and reliability by selecting a relay terminal capable of maximizing a channel capacity.

BACKGROUND ART

Recently, a MIMO technology has been actively researched which can increase a transmission capacity per unit bandwidth and increase communication quality by using multiple antennas, that is, relay terminals between a transmission terminal and a reception terminal in order to efficiently use scarce frequency resources in a mobile communication system, and commercialization of the MIMO technology is attempted.

A cooperative diversity technology capable of obtaining a spatial diversity gain is researched based on the MIMO technology. The cooperative diversity technology is capable of generating multiple communication paths between a transmission node and a reception node by using a relay terminal and obtaining a spatial diversity gain through the paths.

An opportunistic relaying technique, which is one of the cooperative diversity technologies, is a technique in which all nodes each have a single antenna and only a relay terminal having a transmittable opportunity transmits a signal when there are multiple relay terminals. This technique is a method of selecting a relay terminal having the best channel between a transmission node and a relay terminal and the best channel between the relay terminal and a reception node and is relatively simple to implement, and additional selective diversity gain disclosure be obtained.

Similarly, a cooperative spatial multiplexing technology, which can obtain a spatial multiplexing gain by using a relay terminal, is researched. In the cooperative spatial multiplexing technique, when a reception node has multiple antennas, multiple relay terminals equal to the number of antennas of the reception nodes divide a transmission signal and transmit the divided signal, thereby obtaining the spatial multiplexing gain. At this time, each relay terminal has an advantage of reducing power consumption and complexity but has a problem in transmitting a signal at a lower transmission rate than the transmission rate of a transmission node.

A method of opportunistically selecting a fixed number of relay terminals having an optimal channel capacity by applying the cooperative spatial multiplexing technique and an opportunistic relaying method in an environment where there are more relay terminals than the number of antennas of the reception node, is proposed.

This method compares channel capacities for all selectable cases among all the relay terminals and selects relay terminals having the maximum channel capacity and has increased outage performance compared to the cooperative diversity technique in the same environment.

However, the existing cooperative spatial multiplexing technique has a problem in that it is necessary to select as few relay terminals as possible in terms of data transmission performance and a transmission method is not optimized according depending on a channel state when transmitting data having a fixed transmission rate.

The technology becoming a background of the present disclosure is disclosed in Korean Patent Publication No. 10-2014-0115260 (published on Sep. 30, 2014).

DESCRIPTION OF EMBODIMENTS

Technical Problem

An object of the present disclosure is to provide a MIMO-OFDM system for increasing a transmission rate and reliability by selecting a relay terminal capable of maximizing a channel capacity.

Solution to Problem

According to an embodiment of the present disclosure, a MIMO-OFDM system for increasing reliability includes a transmission terminal that includes $N_t$ transmission antennas and transmits a MIMO signal through relay terminals; and a reception terminal that receives the MIMO signal from the relay terminal through $N_r$ reception antennas, wherein the transmission terminal extracts a composite channel coefficient from a composite channel generated by matching a channel between the transmission terminal and the reception terminal with a channel between each of a plurality of the relay terminals and the reception terminal, selects the relay terminal corresponding to the composite channel coefficient having a maximized channel capacity from among the plurality of relay terminals by using the extracted composite channel coefficient, and transmits a MIMO signal to the reception terminal through the selected relay terminal.

The transmission terminal may include a communication unit that estimates the composite channel by respectively transmitting pilot signals to the plurality of relay terminals; a singular value extraction unit that acquires information on a channel matrix by using the estimated composite channel and extracts a singular value by applying a singular value decomposition (SVD) method to the channel matrix; a composite channel coefficient calculation unit that calculates the composite channel coefficient by using the extracted singular value; and a relay terminal selection unit that calculates a channel capacity by using the calculated composite channel coefficient and selects a relay terminal having a maximum value among the calculated channel capacities from among the plurality of relay terminals.

The singular value extraction unit may extract a matrix for the singular value by using a following equation:

$$H_K = U_K \Sigma_K V_K^H$$

where $H_K$ denotes a composite channel matrix generated by using a K-th relay terminal, $\Sigma_K$ is a $N_r \times N_t$ matrix having a singular value $\sigma_N^2$ of the composite channel matrix $H_k$ as a diagonal component, $U_K$ is a Nr×Nr matrix consisting of a singular vector on the left side of a singular value $H_K$, and $V_K^H$ is a $N_t \times N_t$ matrix consisting of a singular vector on the right side of the singular value.

The composite channel coefficient calculation unit may calculate the composite channel coefficient by inserting the calculated singular value into a following equation:

$$\Lambda_K = \Pi_{N_t}(1+\sigma_N^2)$$

where $\Lambda_K$ denotes a product of the composite channel coefficients of the relay terminals, and $\sigma_N^2$ denotes the singular value.

The relay terminal selection unit may calculate a channel capacity C for each of the plurality of relay terminals by using a following equation:

$$C = \log_2 \Pi_{N_t}(1+\rho\sigma_N^2)$$

where $\rho$ denotes $$\frac{P_t}{N_0 N},$$

$P_t$ is a power of a transmission signal, $N_t$ denotes the number of transmission antennas, and $N_O$ denotes a noise power, and $\Pi_N(1+\sigma_N^2)$ is converted into a product $\Lambda_K$ of the composite channel coefficients of the relay terminals.

The reception terminal may include a reception unit that receives the MIMO signal through the transmission terminal and the selected relay terminal; a detection unit that detects an estimation signal $\hat{X}_{sd}$ transmitted through the channel between the transmission terminal and the reception terminal by applying a zero-forcing detection technique to the received MIMO signal and an estimation signal $\hat{X}_{rd}$ transmitted through the channel between the relay terminal and the reception terminal; and a signal estimation unit that estimates a final signal by assigning a weighted value to each of the detected estimation signals.

The received MIMO signal may be represented by a following equation:

$$Y_{D_K} = Y_{SD} + Y_{R_KD}$$

$$H_{SD}X + n_{SD} + H_{R_KD}X + n_{R_KD}$$

where $Y_{SD}$ denotes a reception signal transmitted through the channel between the transmission terminal and the reception terminal without passing through the relay terminal, and $Y_{R_KD}$ denotes a reception signal transmitted through a K-th relay terminal.

The signal estimation unit may estimate the final signal $\hat{X}\bullet$ of a following equation by combining a weighted value consisting of channel coefficients $\sigma_N^2$ with each of the detected estimation signals:

$$\hat{X} = \frac{\sigma_{sd}}{\sigma_{sd}+\sigma_{rd}}\hat{X}_{sd} + \frac{\sigma_{rd}}{\sigma_{sd}+\sigma_{rd}}\hat{X}_{rd}$$

where $\sigma_{sd}$ denotes a channel coefficient between the transmission terminal and the reception terminal, and $\sigma_{rd}$ denotes a channel coefficient between the selected relay terminal and the reception terminal.

Advantageous Effects of Disclosure

The present disclosure proposes a relay terminal selecting method using a channel coefficient of a composite channel to select an optimal relay terminal, and thus, there is advantages in that a system capacity is maximized to increase a transmission rate in wireless communication and a more reliable wireless communication service may be provided.

In addition, according to the present disclosure, a relay terminal that guarantees reliability of a reception signal may be more effectively selected even in a multiple relay terminal environment by using independent channel coefficients of a channel between each relay terminal and a reception terminal and a composite channel, the transmission terminal may select a relay terminal that maximizes a channel capacity, and the reception terminal may detect the combined reception signal by using channel coefficients to increase a transmission rate.

DETAILED DESCRIPTION OF DISCLOSURE

Figure 1:
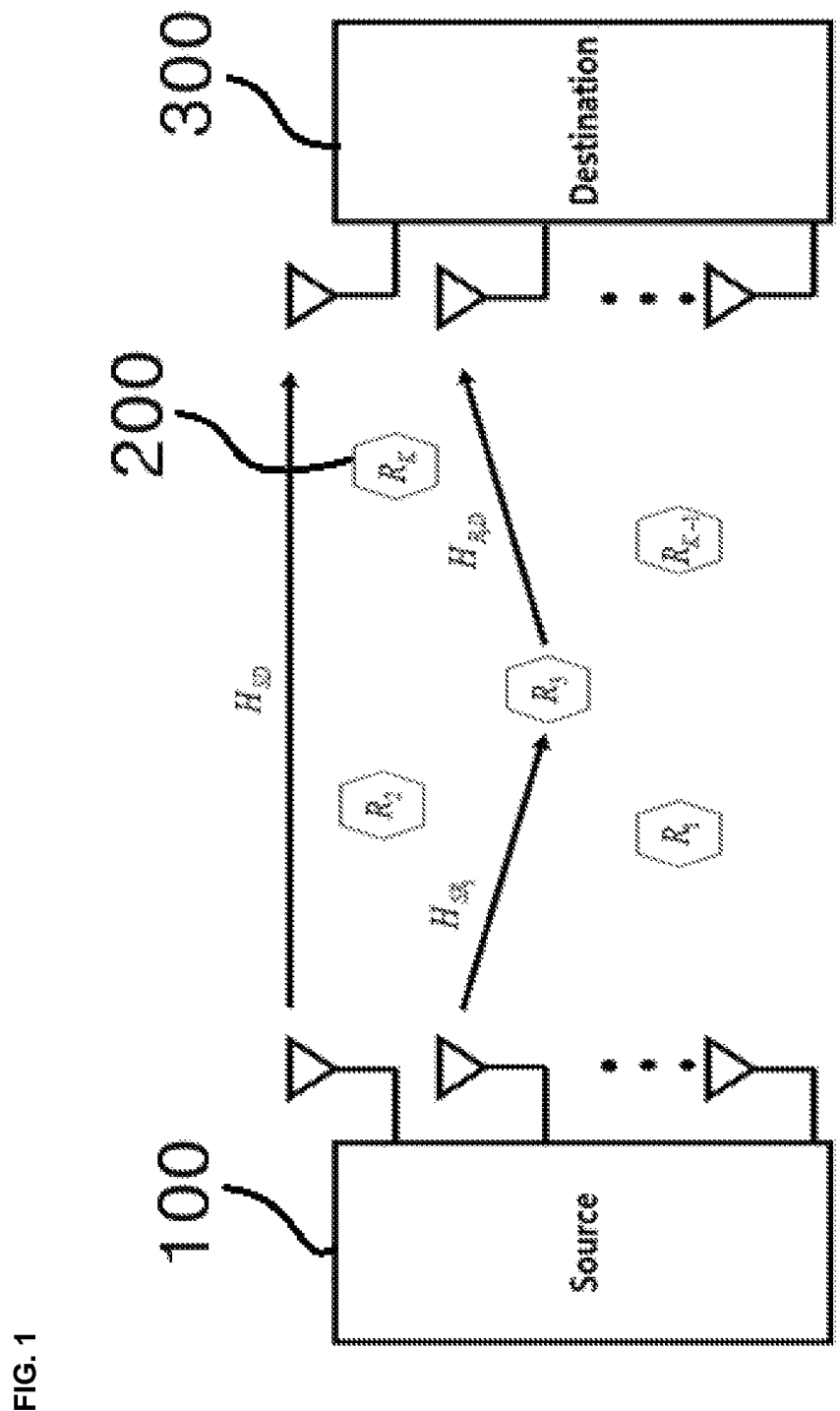
FIG. 1 is a diagram illustrating a MIMO-OFDM system according to an embodiment of the present disclosure.

Hereinafter, preferred embodiments of the present disclosure will be described in detail with reference to the accompanying drawings. In the process of doing this, thicknesses of the lines, sizes of configuration elements, or the like illustrated in the drawings may be exaggerated for the sake of clear and convenient description.

In addition, terms to be described below are defined in consideration of functions in the present disclosure and may vary according to the intention or custom of users or operators. Therefore, definitions of the terms should be made based on content throughout the present specification.

First, a MIMO-OFDM system according to an embodiment of the present disclosure will be described with reference to FIG. 1.

FIG. 1 is a diagram illustrating the MIMO-OFDM system according to the embodiment of the present disclosure.

As illustrated in FIG. 1, the MIMO-OFDM system according to the embodiment of the present disclosure includes a transmission terminal 100, a relay terminal 200, and a reception terminal 300.

First, the transmission terminal 100 includes $N_t$ transmission antennas and transmits signals, which are received by a plurality of reception terminals 300, each including $N_r$ antennas, to the relay terminals 200 by using a power domain. At this time, the transmission terminal 100 calculates a composite channel coefficient in order to increase reliability of a transmission signal and to maximize a transmission capacity, and selects any one relay terminal 200 of the K relay terminals 200 according to the calculated composite channel coefficient. Then, the transmission terminal 100 transmits a signal through the selected relay terminal 200.

In addition, the number of relay terminals 200 is K, demodulates the signal received from the transmission terminal 100 by using a decode-and-forward (DF) method, modulates the signal again, and transmits the signal to the reception terminal 300.

Finally, the reception terminal 300 includes $N_r$ antennas and estimates a signal received through a channel between the transmission terminal 100 and the reception terminal 300 and a signal received through a channel between the relay terminal 200 and the reception terminal 300 by using a zero-forcing (ZF) detection technique. Then, the reception terminal 300 reflects a channel state by assigning a weighted value according to the composite channel coefficient to each of the estimated signals.

Hereinafter, the transmission terminal according to the embodiment of the present disclosure will be described in more detail with reference to FIG. 2.

Figure 2:
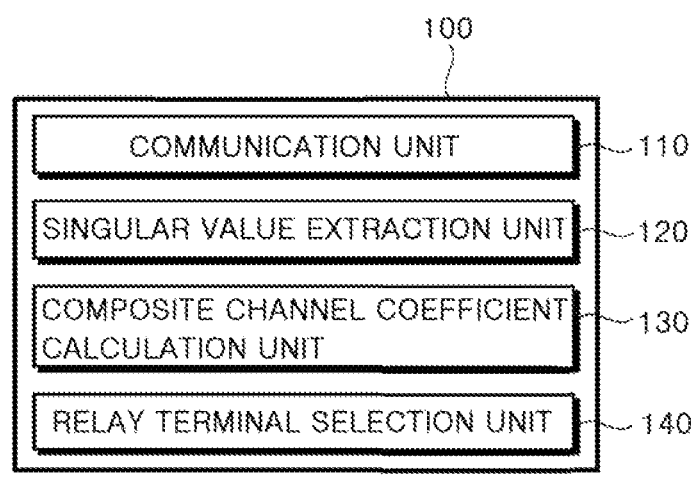
FIG. 2 is a block diagram illustrating a transmission terminal of FIG. 1.

FIG. 2 is a block diagram illustrating the transmission terminal of FIG. 1.

As illustrated in FIG. 2, the transmission terminal 100 according to the embodiment of the present disclosure includes a communication unit 110, a singular value extraction unit 120, a composite channel coefficient calculation unit 130, and a relay terminal selection unit 140.

First, the communication unit 110 transmits pilot signal to the K relay terminals 200 and the N reception terminals 300, respectively. In addition, the communication unit 110 acquires information on a channel between the reception terminal 100 and the relay terminal 200 and a channel between the transmission terminal 100 and the reception terminal 300 by using signals received in response to the transmitted pilot signals.

Then, the communication unit 110 estimates a composite channel by matching the channel between the reception terminal 100 and the relay terminal 200 with the channel between the transmission terminal 100 and the reception terminal 300.

The singular value extraction unit 120 generates a channel matrix for each composite channel for the K relay terminals 200.

The channel matrix is a Hermitian matrix and is represented by following Equation 1.

$$A = HH^H = H^H H \quad \text{[Equation 1]}$$

Then, the singular value extraction unit 120 decomposes the channel matrix generated by applying a singular value decomposition (SVD) into eigenvectors which are linearly independent.

A relation equation according to the SVD can be represented by following Equation 2.

$$HH^H = Q\Lambda Q^H \quad \text{[Equation 2]}$$

Here, H denotes a composite channel of $H_{SD}$ (a channel between a transmission terminal and a reception terminal) and $H_{R_KD}$ (a channel between a relay terminal and a reception terminal). Q is a square matrix in which an i-th column is an eigenvector of the composite channel, and Λ is a diagonal matrix in which an i-th component is an i-th singular value.

Therefore, the singular value extraction unit 120 removes a non-diagonal real part element from the matrix by performing a real part diagonalization of the generated channel matrix as illustrated in Equation 2, and then removes a non-diagonal imaginary part in the matrix by performing an imaginary part diagonalization.

Then, the singular value extraction unit 120 calculates a $U_K$ matrix, a $\Sigma_K$ matrix, and a $V_K^H$ matrix from the Q matrix and the Λ matrix.

The $U_K$ matrix, the $\Sigma_K$ matrix, and the $V_K^H$ matrix disclosure be calculated by following Equation 3.

$$H_K = U_K \Sigma_K V_K^H \quad \text{[Equation 3]}$$

Here, $H_K$ represents a composite channel matrix generated by using the K-th relay terminal, $\Sigma_K$ is a $N_r \times N_t$ matrix having a singular value $\sigma_N^2$ of the composite channel matrix $H_K$ as a diagonal component, $U_K$ is a $N_r \times N_r$ matrix consisting of a singular vector on the left side of the singular value of $H_K$, and $V_K^H$ is a $N_t \times N_t$ matrix consisting of a singular vector on the right side of the singular value.

Then, the composite channel coefficient calculation unit 130 calculates a composite channel coefficient by using the singular value extracted for each of the K relay terminals 200 using Equation 3.

The composite channel coefficient is calculated by using following Equation 4.

$$\Lambda_K = \Pi_{N_t}(1 + \sigma_N^2) \quad \text{[Equation 4]}$$

Here, $\Lambda_K$ denotes the product of the composite channel coefficients of the K-th relay terminal, and $\sigma_N^2$ denotes a singular value.

The relay terminal selection unit 140 calculates a channel capacity by using the calculated composite channel coefficient and selects a relay terminal having a maximum value among the calculated channel capacities from among the K relay terminals.

In addition, a channel capacity C is defined by following Equation 5.

[Equation 5]

$$C = \log_2 \det\left(I + \frac{P_t}{N_0 N_t} HH^H\right)$$

Here, I is an eigen matrix, $P_t$ is a power of a transmission signal, $N_t$ is the number of transmission antennas, and $N_o$ is a noise power.

When Equation 2 is inserted into Equation 5 relating to the channel capacity, following Equation 6 is derived therefrom.

$$C = \log_2 \Pi_{N_t}(1 + \rho \sigma_N^2) \quad \text{[Equation 6]}$$

Here, ρ denotes $$\frac{P_t}{N_0 N},$$

$P_t$ is a power of a transmission signal, $N_t$ denotes the number of transmission antennas, and $N_o$ denotes a noise power. Meanwhile, $\Pi_N(1+\sigma_N^2)$ disclosure be converted by being inserted into Equation 4.

The reception terminal 100 according to the embodiment of the present disclosure calculates each channel capacity for K relay terminals 200 by using the number of acquired composite channels and selects the relay terminal having the largest value among the calculated channel capacities. Then, the reception terminal 100 transmits a MIMO signal to the reception terminal 300 through the selected relay terminal 200.

Hereinafter, the reception terminal according to the embodiment of the present disclosure will be described in more detail with reference to FIG. 3.

Figure 3:
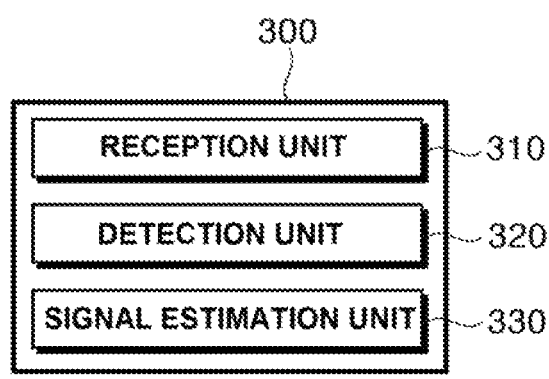
FIG. 3 is a configuration diagram illustrating a reception terminal of FIG. 1.

FIG. 3 is a configuration diagram illustrating the reception terminal of FIG. 1.

As illustrated in FIG. 3, the reception terminal 300 according to the embodiment of the present disclosure includes a reception unit 310, a detection unit 320, and a signal estimation unit 330.

First, the reception unit 310 receives a MIMO signal through the transmission terminal 100 and the selected relay terminal 200.

The MIMO signal disclosure be defined by following Equation 7.

$$Y_{D_K} = Y_{SD} + Y_{R_K D}$$

$$H_{SD}X + n_{SD} + H_{R_K D}X + n_{R_K D}$$ [Equation 7]

Here, $Y_{SD}$ denotes a reception signal transmitted through a channel between the transmission terminal and the reception terminal without passing through the relay terminal, and $Y_{R_K D}$ denotes a reception signal transmitted through a K-th relay terminal.

Then, the detection unit 320 detects a signal received by the reception terminal 300 by using a MIMO detection technique that applies either a linear detection technique or a nonlinear detection technique.

A technique such as zero-forcing (ZF) or minimum mean squared error (MMSE), which is a linear detection techniques of the MIMO detection techniques, has an advantage of low complexity compared to ordered successive interference cancellation (OSIC), decision feedback equalizer (DFE), and maximum likelihood ML which are nonlinear detection techniques. Accordingly, the MIMO-OFDM system according to an embodiment of the present disclosure applies a ZF detection technique to reduce the overall complexity of the transmission terminal 100 and the reception terminal 100.

Therefore, the detection unit 320 detects an estimation signal $\hat{X}_{sd}$ transmitted through a channel between the transmission terminal 100 and the reception terminal 300 and an estimation signals $\hat{X}_{rd}$ transmitted through a channel between the selected relay terminal 200 and the reception terminal 300 by applying the ZF technique.

Then, the signal estimation unit 330 estimates a final signal by assigning weighted values to the detected estimation signals $\overline{X}_{sd}$ and $\overline{X}_{rd}$ respectively.

In addition, the signal estimation unit 330 estimates $\overline{X}$. by respectively assigning weighted values to the estimation signal $\overline{X}_{sd}$ transmitted through the channel between the transmission terminal 100 and the reception terminal 300 and the estimation signal $\hat{X}_{rd}$ transmitted through the channel between the selected relay terminal 200 and the reception terminal 300 by using a channel coefficient $\sigma_N^2$ calculated by using Equation 3.

The final signal $\hat{X}\bullet$ is represented by following Equation 8.

[Equation 8]

$$\hat{X} = \frac{\sigma_{sd}}{\sigma_{sd} + \sigma_{rd}} \hat{X}_{sd} + \frac{\sigma_{rd}}{\sigma_{sd} + \sigma_{rd}} \hat{X}_{rd}$$

Here, $\sigma_{sd}$ denotes a channel coefficient between a transmission terminal and a reception terminal, and $\sigma_{rd}$ denotes a channel coefficient between the selected relay terminal and the reception terminal.

Hereinafter, a method of maximizing a channel capacity and increasing a transmission rate by using the MIMO-OFDM system according to the embodiment of the present disclosure will be described in more detail with reference to FIGS. 4 to 6.

Figure 4:
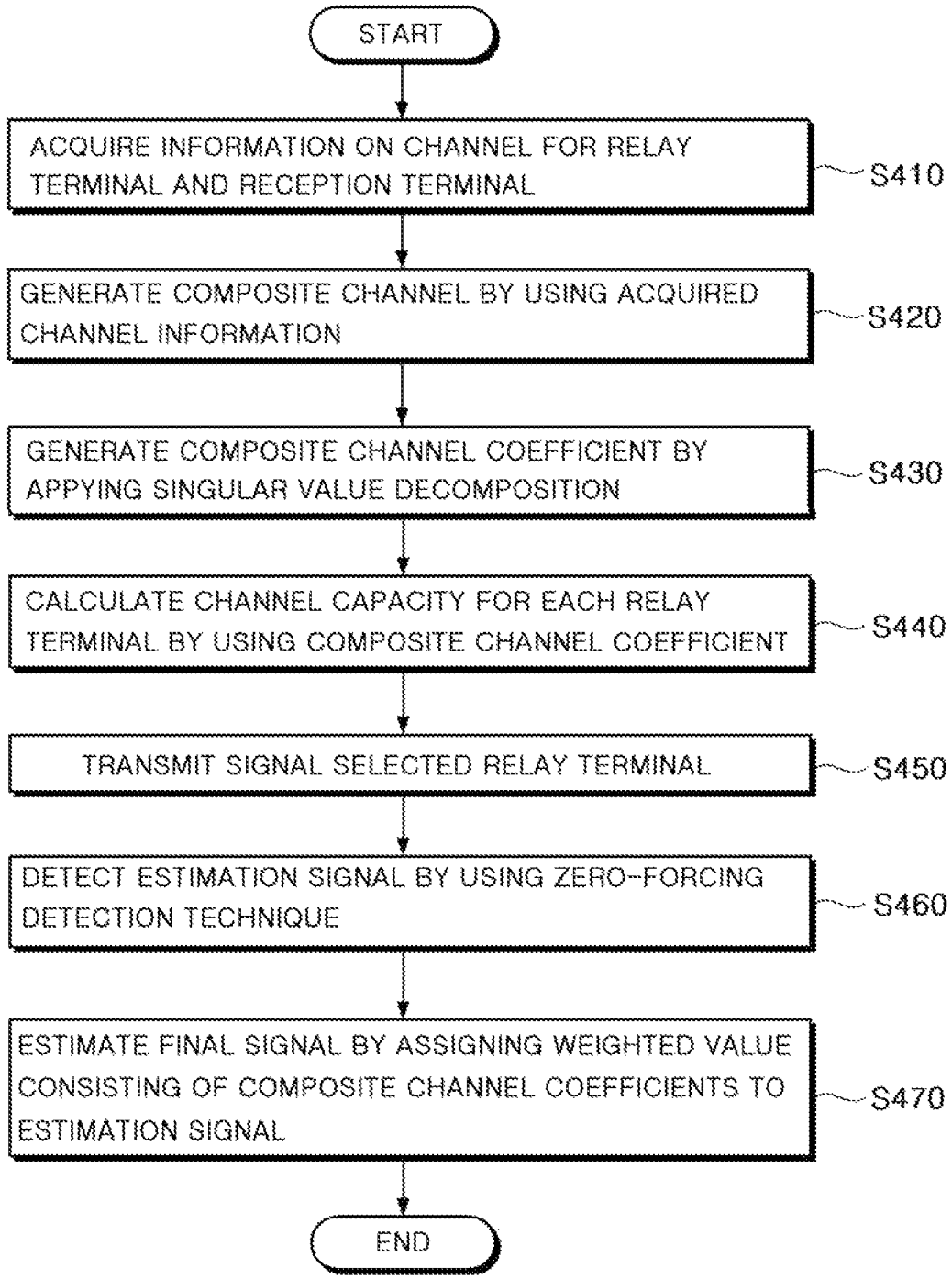
FIG. 4 is a flowchart illustrating an operation flow of a method for maximizing a channel capacity and increasing a transmission rate in the MIMO-OFDM system according to the embodiment of the present disclosure.

FIG. 4 is a flowchart illustrating an operation flow of the method for maximizing the channel capacity and increasing the transmission rate of the MIMO-OFDM system according to the embodiment of the present disclosure, and a detailed operation of the present disclosure will be described with reference to the flowchart.

Figure 5:
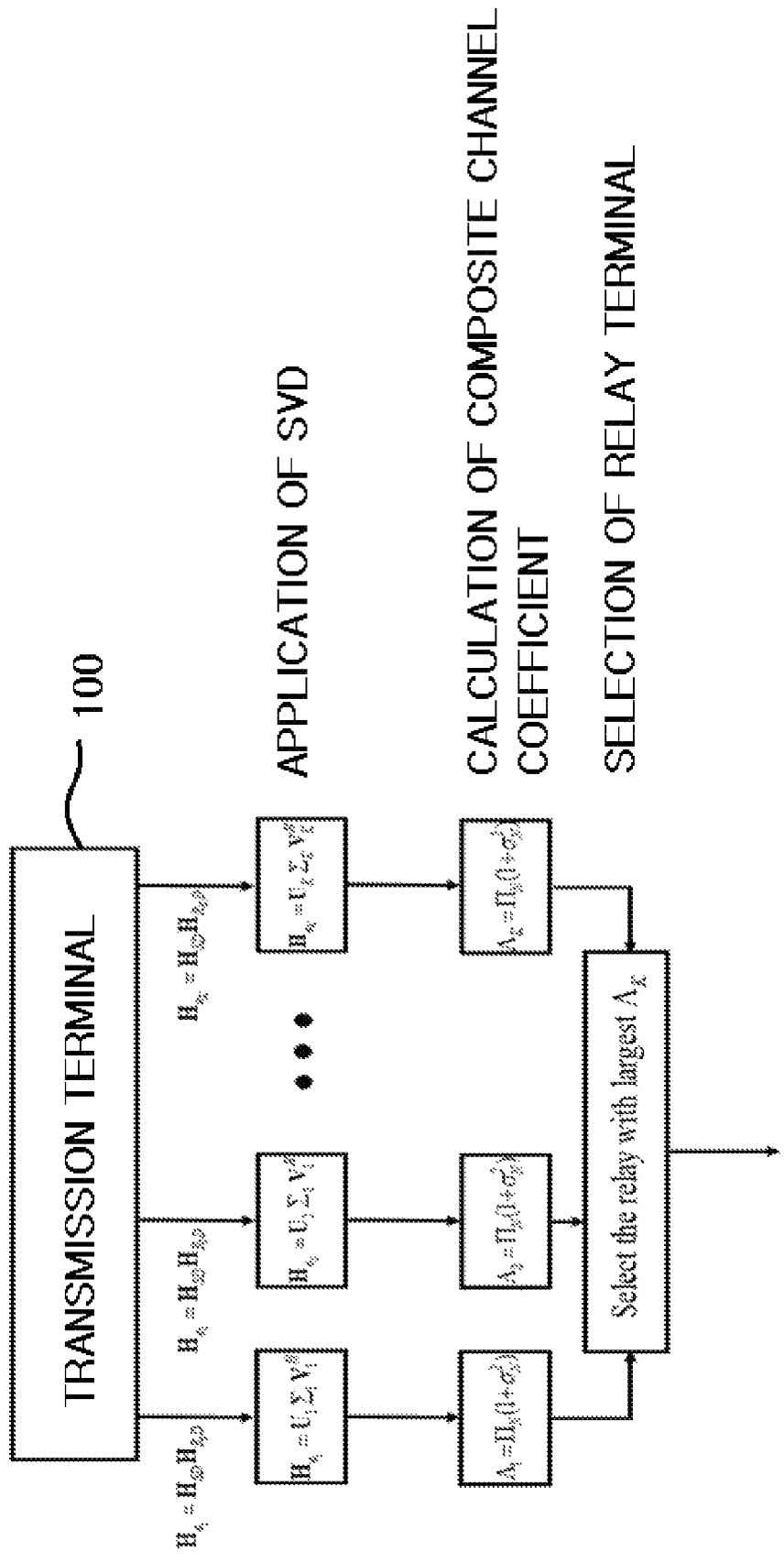
FIG. 5 illustrates a structure of the transmission terminal according to the embodiment of the present disclosure.
Figure 6:
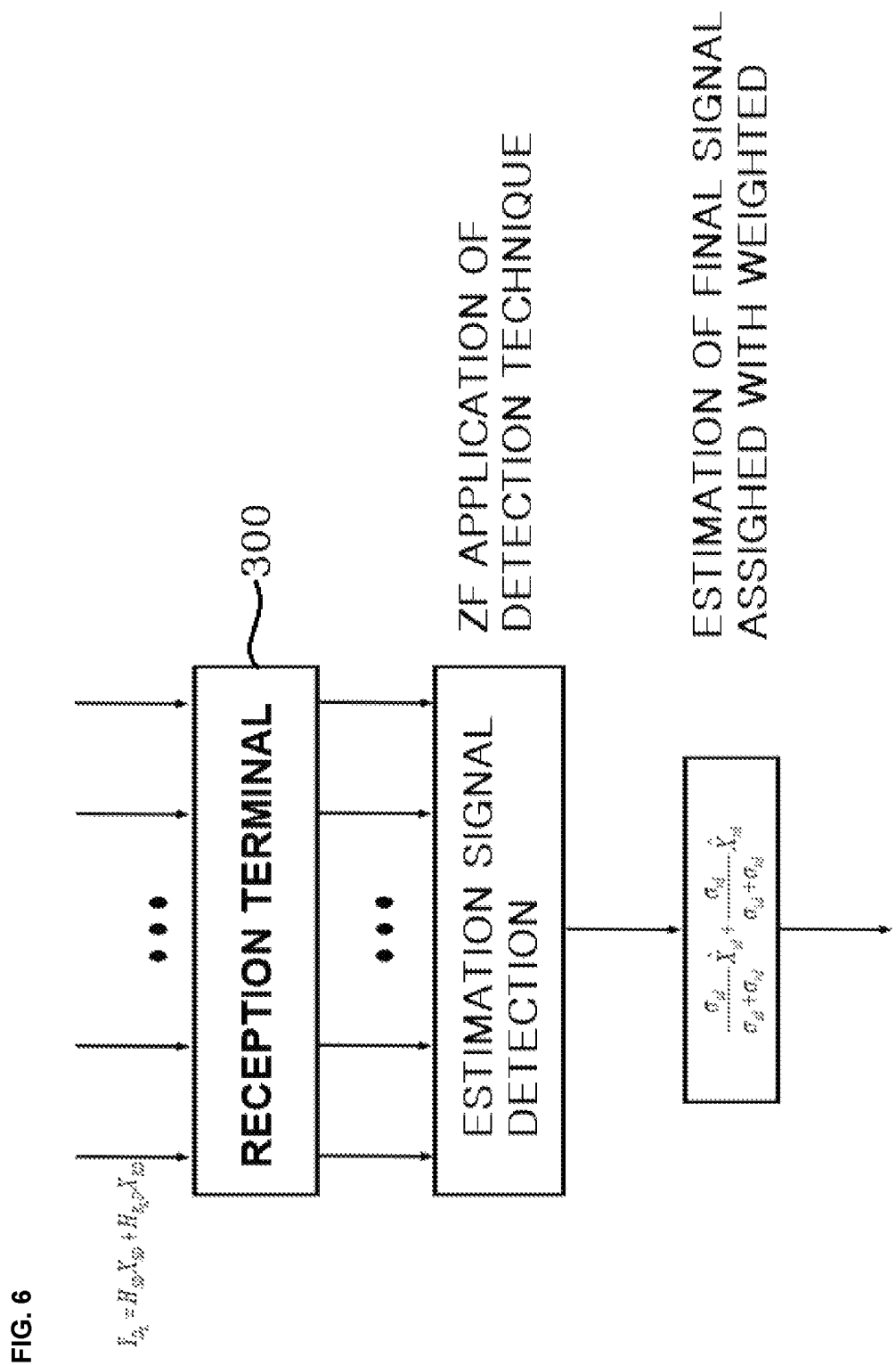
FIG. 6 illustrates a structure of the reception terminal according to the embodiment of the present disclosure.

In addition, FIG. 5 illustrates a structure of the transmission terminal according to the embodiment of the present disclosure, and FIG. 6 illustrates a structure of the reception terminal according to the embodiment of the present disclosure.

According to the embodiment of the present disclosure, first, the transmission terminal 100 including $N_t$ antennas transmits pilot signals to the K relay terminals 200 and the reception terminal 300 including $N_r$ antennas by using a power domain to acquire information on channels (S410).

The MIMO-OFDM system according to the embodiment of the present disclosure can acquire a channel capacity when the $N_t$ antennas transmit signals with the same power while knowing information on all channels to which a MIMO signal can be input.

Therefore, the reception terminal 100 acquires the information on all channels to which the MIMO signal can be input and generates a composite channel by using the acquired channel information (S420).

Here, the composite channel is a channel combined by matching the channel between the transmission terminal 100 and the reception terminal 300 with the channel between the transmission terminal 100 and one relay terminal 200 selected from among the K relay terminals 200.

Then, the transmission terminal 100 generates a channel matrix from the composite channel and calculates a composite channel coefficient by applying a singular value decomposition (SVD) to the generated channel matrix (S430).

At this time, in step S430, each composite channel coefficient is calculated for each of the K relay terminals 200 by using Equation 2 to Equation 4.

Then, the transmission terminal 100 calculates each channel capacity for the K relay terminals 200 by using the calculated composite channel coefficient (S440).

At this time, in step S440, the channel capacity is calculated for each of the K relay terminals 200 by using Equation 5 and Equation 6.

Consequently, according to the embodiment of the present disclosure, the larger the value of the composite channel coefficient, the larger the value of the channel capacity. Accordingly, the reception terminal 100 selects the relay terminal 200 corresponding to the composite channel coefficient for maximizing the channel capacity by using the extracted composite channel coefficient.

Accordingly, as illustrated in FIG. 5, the reception terminal 100 selects the relay terminal 200 having the largest composite channel coefficient value from among the K relay terminals 200 and transmits a signal to the reception terminal 300 by using the selected relay terminal 200 (S450).

Then, the reception terminal 300 detects the reception signal by using a ZF detection technique in step S450 (S460).

That is, the reception terminal 300 respectively detects the estimation signal $\overline{X}_{sd}$ transmitted through the channel between the transmission terminal and the reception terminal and the estimation signal $\hat{X}_{rd}$ transmitted through the channel between the relay terminal and the reception terminal by applying the ZF detection technique.

Then, the reception terminal 300 estimates a final signal by assigning a weighted value to each of the detected estimation signals $\hat{X}_{sd}$ and $\hat{X}_{rd}$ (S470).

As illustrated in FIG. 6, the estimation signals $\hat{X}_{sd}$ and $\hat{X}_{rd}$ are combined to each other by a weighted value composed of composite channel coefficients, and the final signal to which the weighted value is assigned is estimated by using Equation 8.

Figure 7:
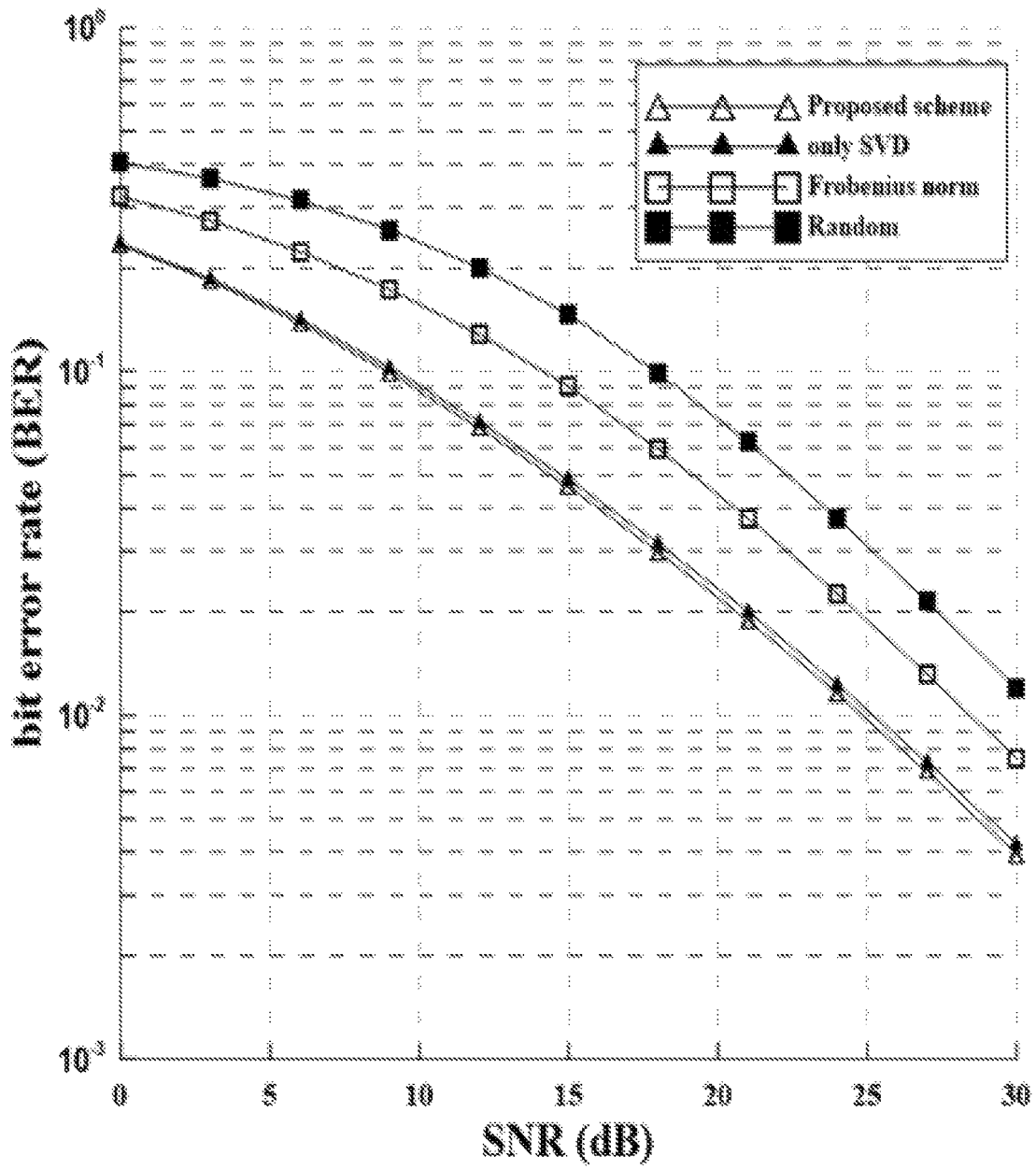
FIG. 7 is a graph for comparing each bit error rate (BER) according to a signal to noise power ratio (SNR) by using a method of selecting a relay terminal by using the MIMO-OFDM system according to the embodiment of the present disclosure and a general relay terminal selecting technique of the related art.

FIG. 7 is a graph for comparing each bit error rate (BER) according to a signal to noise power ratio (SNR) by using a method of selecting a relay terminal by using the MIMO-OFDM system according to the embodiment of the present disclosure and a general relay terminal selecting technique of the related art.

In a simulation of FIG. 7, a length of CP is 32, and 16-quadrature amplitude modulation (QAM) was used in an orthogonal frequency division (OFDM) system having 128 subcarrier waves.

In addition, in the method of selecting a relay terminal by using the MIMO-OFDM system according to the embodiment of the present disclosure and the general relay terminal selecting technique of the related art, the number of relay terminals was assumed to be 16 and the number of transmission and reception antennas was assumed to be N=4.

In addition, each relay terminal uses a DF technique and is randomly located within a distance range of 0.25 to 0.5 when a distance between the transmission terminal and the reception terminal is assumed to be 1.

As can be seen from FIG. 7, the method of selecting a relay terminal by using the MIMO-OFDM system according to the embodiment of the present disclosure has a higher transmission rate than transmission rates of a random relay terminal selecting technique which is a relay terminal selecting technique of the related art and a relay terminal selecting technique using Frobenius norm.

This is because the relay terminal selecting method according to the embodiment of the present disclosure selects a relay terminal by effectively considering a channel state through a channel coefficient obtained by using a singular value decomposition (SVD) for a composite channel, unlike techniques of the related art. In addition, the reception terminal reflects the channel state by assigning a weighted value to the signal received through a path between the transmission terminal and the reception terminal and the signal received through a path between the relay terminal and the reception terminal by using the channel coefficient of each path.

In FIG. 7, a random relay terminal selecting technique in which the channel state is not considered shows the lowest transmission rate. Next, the relay terminal selecting method using the Frobenius norm considers channel information and considers only each piece of the channel information without a composite channel, thus having a lower transmission rate than the transmission rate of the relay terminal selecting method according to the embodiment of the present disclosure.

In addition, a technique (Only SVD) that is not combined by using a weighted value using a channel coefficient shows a lower transmission rate than the transmission rate of the technique proposed by the present disclosure.

That is, it can be seen that the transmission rate of the MIMO-OFDM system according to the embodiment of the present disclosure is higher than the transmission rate of the technique of the related art with respect to the overall signal-to-noise ratio (SNR). This means that an optimal relay terminal is selected in a cooperative communication through a technique using channel information, thereby increasing a transmission rate of the entire system and increasing a system capacity.

As described above, the MIMO-OFDM system according to the embodiment of the present disclosure proposes a relay terminal selecting method using a channel coefficient of a composite channel to select an optimal relay terminal, and thus, there is advantages in that a system capacity is maximized to increase a transmission rate in wireless communication and a more reliable wireless communication service may be provided.

In addition, according to the embodiment of the present disclosure, a relay terminal that guarantees reliability of a reception signal may be more effectively selected even in a multiple relay terminal environment by using independent channel coefficients of a channel between each relay terminal and a reception terminal and a composite channel, the transmission terminal may select a relay terminal that maximizes a channel capacity, and the reception terminal may detect the combined reception signal by using channel coefficients to increase a transmission rate.

The present disclosure is described with reference to the embodiments illustrated in the drawings, which are only exemplary, and those skilled in the field to which the present technology belongs will understand that various modifications and other equivalent embodiments may be made therefrom. Accordingly, the true technical protection scope of the present disclosure should be determined by the technical idea of the following claims.

SINGS LIST

100: transmission terminal
110: communication unit
120: singular value extraction unit
130: composite channel coefficient calculation unit
140: relay terminal selection unit
200: relay terminal
300: reception terminal
310: reception unit
320: detection unit
330: signal estimation unit

The invention claimed is:

1. A MIMO-OFDM system for increasing reliability comprising:
 a transmission terminal that includes $N_t$ transmission antennas and transmits a MIMO signal through relay terminals; and
 a reception terminal that receives the MIMO signal from the relay terminal through $N_r$ reception antennas,
 wherein the transmission terminal extracts a composite channel coefficient from a composite channel generated by matching a channel between the transmission terminal and the reception terminal with a channel between each of a plurality of the relay terminals and the reception terminal, selects the relay terminal corresponding to the composite channel coefficient having a maximized channel capacity from among the plurality of relay terminals by using the extracted composite channel coefficient, and transmits a MIMO signal to the reception terminal through the selected relay terminal,
 wherein the transmission terminal includes:
 a communication unit that estimates the composite channel by respectively transmitting pilot signals to the plurality of relay terminals;
 a singular value extraction unit that acquires information on a channel matrix by using the estimated composite channel and extracts a singular value by applying a singular value decomposition (SVD) method to the channel matrix;
 a composite channel coefficient calculation unit that calculates the composite channel coefficient by using the extracted singular value; and a relay terminal selection unit that calculates a channel capacity by using the calculated composite channel coefficient and selects a relay terminal having a maximum value among the calculated channel capacities from among the plurality of relay terminals.

2. The MIMO-OFDM system of claim 1, wherein the singular value extraction unit extracts a matrix for the singular value by using a following equation:

$$H_K = U_K \Sigma_K V_K^H$$

where $H_K$ denotes a composite channel matrix generated by using a K-th relay terminal, $\Sigma_K$ is a $N_r \times N_t$ matrix having a singular value $\sigma_N^2$ of the composite channel matrix $H_k$ as a diagonal component, $U_K$ is a Nr×Nr matrix consisting of a singular vector on the left side of a singular value $H_K$, and $V_K^H$ is a $N_t \times N_t$ matrix consisting of a singular vector on the right side of the singular value.

3. The MIMO-OFDM system of claim 2, wherein the composite channel coefficient calculation unit calculates the composite channel coefficient by inserting the calculated singular value into a following equation:

$$\Lambda_K = \Pi_{N_t}(1+\sigma_N^2)$$

where $\Lambda_k$ denotes a product of the composite channel coefficients of the relay terminals, and $\sigma_N^2$ denotes the singular value.

4. The MIMO-OFDM system of claim 3, wherein the relay terminal selection unit calculates a channel capacity C for each of the plurality of relay terminals by using a following equation:

$$C = \log_2 \Pi_{N_t}(1+\rho \sigma_N^2)$$

where ρ denotes $$\frac{P_t}{N_0 N},$$

$P_t$ is a power of a transmission signal, $N_t$ denotes the number of transmission antennas, and $N_O$ denotes a noise power, and $\Pi_N(1+\sigma_N^2)$ is converted into a product $\Lambda_K$ of the composite channel coefficients of the relay terminals.

5. The MIMO-OFDM system of claim 1, wherein the reception terminal includes:

a reception unit that receives the MIMO signal through the transmission terminal and the selected relay terminal;

a detection unit that detects an estimation signal $\hat{X}_{sd}$ transmitted through the channel between the transmission terminal and the reception terminal by applying a zero-forcing detection technique to the received MIMO signal and an estimation signal $\hat{X}_{rd}$ transmitted through the channel between the relay terminal and the reception terminal; and a signal estimation unit that estimates a final signal by assigning a weighted value to each of the detected estimation signals.

6. The MIMO-OFDM system of claim 5, wherein the received MIMO signal is represented by a following equation:

$$Y_{D_K} = Y_{SD} + Y_{R_K D}$$

$$H_{SD}X + n_{SD} + H_{R_K D}X + n_{R_K D}$$

where $Y_{SD}$ denotes a reception signal transmitted through the channel between the transmission terminal and the reception terminal without passing through the relay terminal, and $Y_{R_K D}$ denotes a reception signal transmitted through a K-th relay terminal.

7. The MIMO-OFDM system of claim 5, wherein the signal estimation unit estimates the final signal $\hat{X}\bullet$ of a following equation by combining a weighted value consisting of channel coefficients $\sigma_N^2$ with each of the detected estimation signals:

$$\hat{X} = \frac{\sigma_{sd}}{\sigma_{sd} + \sigma_{rd}} \hat{X}_{sd} + \frac{\sigma_{rd}}{\sigma_{sd} + \sigma_{rd}} \hat{X}_{rd}$$

where $\sigma_{sd}$ denotes a channel coefficient between the transmission terminal and the reception terminal, and $\sigma_{rd}$ denotes a channel coefficient between the selected relay terminal and the reception terminal.

* * * * *